United States Patent
Murase et al.

(10) Patent No.: US 9,799,434 B2
(45) Date of Patent: Oct. 24, 2017

(54) MAGNETIC FIELD GENERATING DEVICE AND SUPERCONDUCTING ROTARY MACHINE COMPRISING MAGNETIC FIELD GENERATING DEVICE

(71) Applicant: KAWASAKI JUKOGYO KABUSHIKI KAISHA, Kobe-shi, Hyogo (JP)

(72) Inventors: Yohei Murase, Kobe (JP); Katsuya Umemoto, Akashi (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 30 days.

(21) Appl. No.: 14/419,052

(22) PCT Filed: May 10, 2013

(86) PCT No.: PCT/JP2013/003013
§ 371 (c)(1),
(2) Date: Feb. 2, 2015

(87) PCT Pub. No.: WO2014/020805
PCT Pub. Date: Feb. 6, 2014

(65) Prior Publication Data
US 2015/0206635 A1   Jul. 23, 2015

(30) Foreign Application Priority Data
Jul. 31, 2012 (JP) .................................. 2012-169253

(51) Int. Cl.
*H01F 6/06* (2006.01)
*H01F 6/02* (2006.01)
(Continued)

(52) U.S. Cl.
CPC ................. *H01F 6/06* (2013.01); *H01F 6/02* (2013.01); *H02K 9/10* (2013.01); *H02K 55/00* (2013.01);
(Continued)

(58) Field of Classification Search
CPC ............ H01F 6/06; H02K 55/00; H02K 9/10
(Continued)

(56) References Cited

U.S. PATENT DOCUMENTS 4,549,156 A * 10/1985 Mine .................... H01F 6/04
                                                        104/285
5,659,277 A *  8/1997 Joshi ................... H01F 6/06
                                                        324/318
(Continued)

FOREIGN PATENT DOCUMENTS

CN     104067494 A     9/2014
EP   2 822 162 A1     1/2015
(Continued)

OTHER PUBLICATIONS

Machine translation of JP2010263122A.*
(Continued)

*Primary Examiner* — Kawing Chan
(74) *Attorney, Agent, or Firm* — Oliff PLC

(57) ABSTRACT

A magnetic field generating device includes a superconducting coil formed by winding a superconductive wire material; an unseparated conductor plate which includes an electric conductor and is placed such that the conductor plate is insulated from the superconducting coil and is adjacent to the superconducting coil in a winding axis direction of the superconducting coil, and one of main surfaces of the conductor plate faces the superconducting coil; and a protection circuit which is connected in parallel with the (Continued)

superconducting coil and attenuates a current flowing through the superconducting coil.

17 Claims, 12 Drawing Sheets

(51) Int. Cl.
  *H02K 55/04* (2006.01)
  *H02K 9/10* (2006.01)
  *H02K 55/00* (2006.01)
  *H01F 6/04* (2006.01)

(52) U.S. Cl.
  CPC ............... *H02K 55/04* (2013.01); *H01F 6/04* (2013.01); *Y02E 40/625* (2013.01)

(58) Field of Classification Search
  USPC ........................... 310/194; 335/216; 505/166
  See application file for complete search history.

(56) References Cited

U.S. PATENT DOCUMENTS

| | | | | |
|---|---|---|---|---|
| 8,204,563 | B2* | 6/2012 | Wang | G01R 33/288 335/216 |
| 2007/0188280 | A1 | 8/2007 | Park et al. | |
| 2010/0295641 | A1* | 11/2010 | Schild | H01F 6/008 335/216 |
| 2011/0140817 | A1* | 6/2011 | Fukaya | H01F 6/00 335/216 |
| 2011/0257017 | A1* | 10/2011 | Park | G01R 33/3815 505/162 |
| 2012/0019090 | A1 | 1/2012 | Hasegawa et al. | |
| 2012/0286617 | A1* | 11/2012 | Cullen | H02K 55/04 310/211 |
| 2013/0106545 | A1* | 5/2013 | Wang | H01F 6/02 335/216 |

FOREIGN PATENT DOCUMENTS

| | | | |
|---|---|---|---|
| JP | H01220805 A | | 9/1989 |
| JP | 07142245 A | * | 6/1995 |
| JP | H07142245 A | | 6/1995 |
| JP | H07235412 A | | 9/1995 |
| JP | H08-264313 A | | 10/1996 |
| JP | H09103065 A | | 4/1997 |
| JP | 2000253645 A | * | 9/2000 |
| JP | 2002025817 A | | 1/2002 |
| JP | 2003109816 A | | 4/2003 |
| JP | 2003-324010 A | | 11/2003 |
| JP | 2004342972 A | * | 12/2004 |
| JP | 2010263122 A | * | 11/2010 |
| JP | 2010272616 A | | 12/2010 |
| JP | 2012-182176 A | | 9/2012 |

OTHER PUBLICATIONS

Apr. 1, 2016 Office Action issued in Chinese Patent Application 201380034561.7.
Umemoto et al., "Current Status of Research & Development of High-temperature Superconducting Motor for Ship Propulsion,", Cryogenic Engineering, 2012, vol. 47, No. 6, pp. 377-383.
Aug. 6, 2013 International Search Report issued in International Application No. PCT/JP2013/003013.
Feb. 22, 2016 Extended Search Report issued in European Patent Application No. 13825990.8.

* cited by examiner

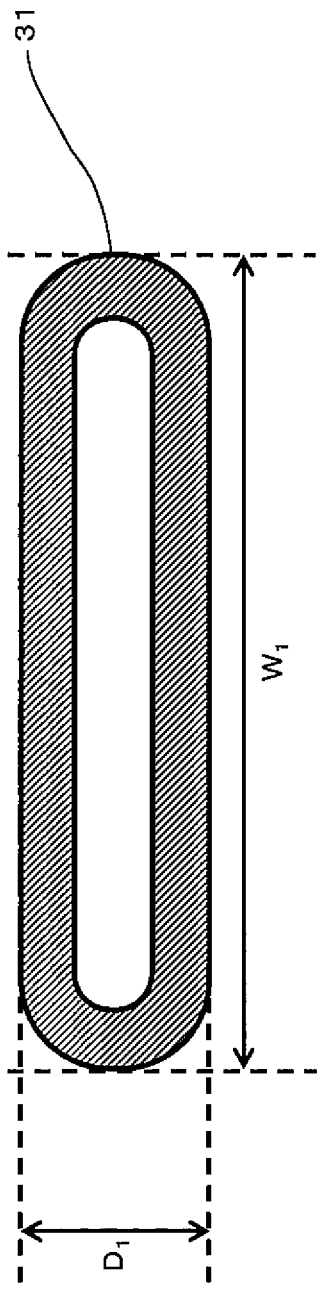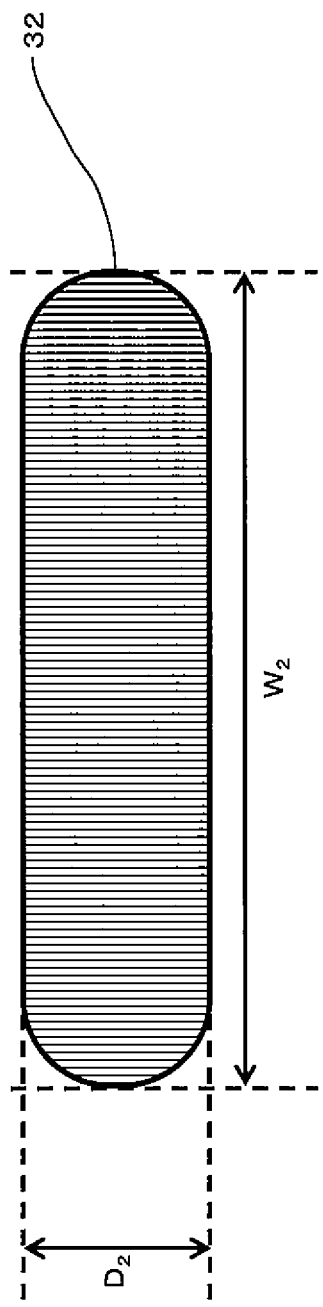
Fig. 2A
Fig. 2B

MAGNETIC FIELD GENERATING DEVICE AND SUPERCONDUCTING ROTARY MACHINE COMPRISING MAGNETIC FIELD GENERATING DEVICE

TECHNICAL FIELD

The present invention relates to a magnetic field generating device and a superconducting rotary machine including the magnetic field generating device. More specifically, the present invention relates to a magnetic field generating device including superconducting coils and a superconducting rotary machine including the magnetic field generating device.

BACKGROUND ART

Patent Literature 1 discloses a superconducting circuit protecting device, and a superconducting magnet device. The devices include a small forcing quench heater, induction coils which recover magnetic energy by magnetic induction, when quench occurs, and a blackout (electric power failure) detector. When the blackout detector detects blackout, the superconducting coils are forced to be quenched by the small forcing quench heater and the magnetic energy is recovered by the induction coils, before the induction coils are changed into a state in which they are unable to recover the energy due to an increase in a resistance with a temperature increase. This allows the superconducting circuit to be protected from the quench during the blackout (abstract).

Patent Literature 2 discloses a high-temperature superconducting magnet. This magnet includes high-temperature superconducting coils in which a plurality of coil units formed by winding electric conductors made of high-temperature superconducting wire material are stacked together, and is configured such that a heat conductive member provided with a heater is inserted into a region between the coil units (claim 5).

CITATION LIST

Patent Literature

Patent Literature 1: Japanese Laid-Open Patent Application Publication No. 2010-272616
Patent Literature 2: Japanese Laid-Open Patent Application Publication No. Hei. 07-142245

SUMMARY OF INVENTION

Technical Problem

An object of the present invention is to more quickly release the energy owned by the superconducting coil to outside the superconducting coil, when quench occurs, in a magnetic field generating device and a superconducting rotary machine including the magnetic field generating device.

Solution to Problem

According to an aspect of the present invention, there is provided a magnetic field generating device comprising: a superconducting coil formed by winding a superconductive wire material; an unseparated conductor plate which comprises an electric conductor and is placed such that the conductor plate is insulated from the superconducting coil and is adjacent to the superconducting coil in a winding axis direction of the superconducting coil, and one of main surfaces of the conductor plate faces the superconducting coil; and a protection circuit which is connected in parallel with the superconducting coil and attenuates a current flowing through the superconducting coil.

According to an aspect of the present invention, there is provided a superconducting rotary machine including the above magnetic field generating device, comprising: a rotary shaft; and a superconducting coil-conductor plate assembly which is fastened to the rotary shaft, and includes the superconducting coil and the unseparated conductor plate; wherein the superconducting coil constitutes a field winding of the superconducting rotary machine, the superconducting rotary machine further comprising: a power supply for supplying a current to the superconducting coil.

Advantageous Effects of Invention

In accordance with a magnetic field generating device and a superconducting rotary machine including the magnetic field generating device, of the present invention, it becomes possible to achieve advantages that the energy owned by the superconducting coil can be released more quickly to outside the superconducting coil, when quench occurs.

BRIEF DESCRIPTION OF DRAWINGS

FIG. 2A is a plan view showing the exemplary schematic configuration of a superconducting coil of the magnetic field generating device according to Example 1 of Embodiment 1.

FIG. 2B is a plan view showing the exemplary schematic configuration of a conductor plate of the magnetic field generating device according to Example 1 of Embodiment 1.

DESCRIPTION OF EMBODIMENTS

Figure 1:
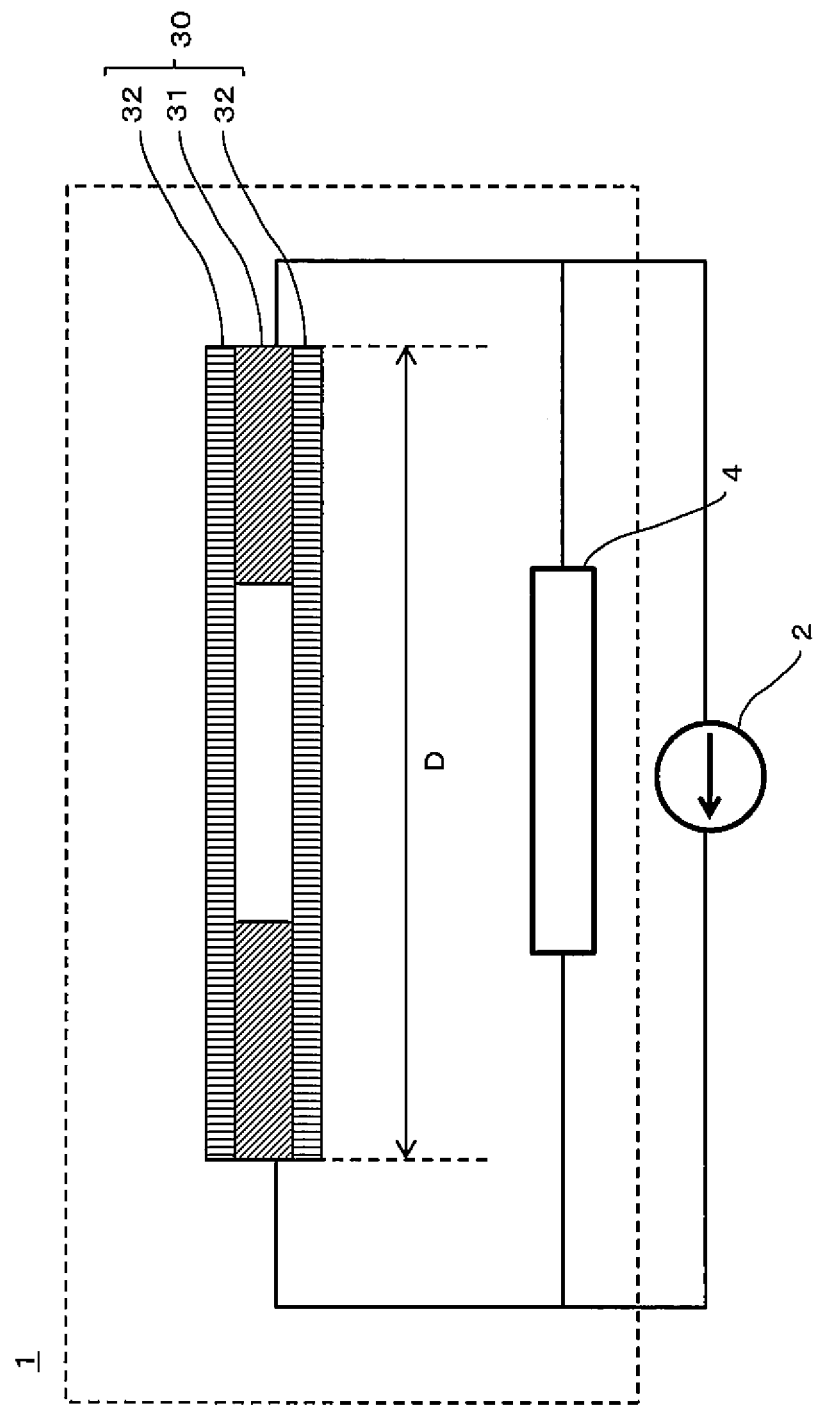
FIG. 1 is a view showing the exemplary schematic configuration of a magnetic field generating device according to Example 1 of Embodiment 1.

Hereinafter, embodiments of the present invention will be described with reference to the attached drawings.

Embodiment 1

According to a first aspect of Embodiment 1, there is provided a magnetic field generating device comprising: a superconducting coil formed by winding a superconductive wire material; an unseparated conductor plate which comprises an electric conductor and is placed such that the conductor plate is insulated from the superconducting coil and is adjacent to the superconducting coil in a winding axis direction of the superconducting coil, and one of main surfaces of the conductor plate faces the superconducting coil; and a protection circuit which is connected in parallel with the superconducting coil and attenuates a current flowing through the superconducting coil.

In this configuration, it becomes possible to more quickly release the energy owned by the superconducting coil to outside the superconducting coil, when quench occurs.

As defined herein, conductor plate refers to a plate comprising an electric conductor with a low electric resistivity.

According to a second aspect of Embodiment 1, in the magnetic field generating device according to the first aspect of Embodiment 1, the unseparated conductor plate covers an entire surface of the superconducting coil when viewed from the winding axis direction of the superconducting coil.

In this configuration, mutual induction between the superconducting coil and the conductor plate is sufficiently large, and when a current in one of the superconducting coil and the conductor plate changes, an electromotive force is more likely to be generated in the other of the superconducting coil and the conductor plate. Therefore, it becomes possible to more effectively release the energy owned by the superconducting coil to outside the superconducting coil, when quench occurs.

According to a third aspect of Embodiment 1, in the magnetic field generating device according to the first aspect or second aspect of Embodiment 1, when the winding axis direction of the superconducting coil is a vertical direction, the unseparated conductor plate is provided such that one unseparated conductor plate is located on each of upper and lower sides of the superconducting coil.

In this configuration, since the conductor plates are provided on both sides of the superconducting coil, it becomes possible to more effectively release the energy owned by the superconducting coil to outside the superconducting coil, when quench occurs.

According to a fourth aspect of Embodiment 1, in the magnetic field generating device according to any one of the first to third aspects of Embodiment 1, the superconducting coil includes a plurality of superconducting coils; the plurality of superconducting coils are stacked together such that their winding axis directions conform to each other; and the unseparated conductor plate is placed such that one unseparated conductor plate is located between adjacent superconducting coils of the plurality of superconducting coils stacked together.

In this configuration, since the conductor plate is provided between the superconducting coils stacked together, it becomes possible to more effectively release the energy owned by the superconducting coil to outside the superconducting coil, when quench occurs.

According to a fifth aspect of Embodiment 1, in the magnetic field generating device according to any one of the first to fourth aspects of Embodiment 1, the superconducting coil has a race truck shape.

In this configuration, the magnetic field generating device may be suitably applied to, for example, a superconducting motor for marine vessel having an elongated shape.

According to a sixth aspect of Embodiment 1, in the magnetic field generating device according to any one of the first to fifth aspects of Embodiment 1, the unseparated conductor plate has the same shape as that of a contour of the superconducting coil, when viewed from the winding axis direction of the superconducting coil.

In this configuration, the conductor plate and the superconducting coil which are stacked together can be easily stored in a structure such as a coil case.

According to a seventh aspect of Embodiment 1, in the magnetic field generating device according to any one of the first to sixth aspects of Embodiment 1, the unseparated conductor plate has a flat plate shape which does not have a groove over an entire surface.

In this configuration, an eddy current is easily generated in the conductor plate, and it becomes possible to more effectively release the energy owned by the superconducting coil to outside the superconducting coil, when quench occurs.

According to an eighth aspect of Embodiment 1, in the magnetic field generating device according to any one of the first to seventh aspects of Embodiment 1, the unseparated conductor plate has a thickness which is as large as or larger than 3/10 of a thickness of the superconducting coil in the winding axis direction.

In this configuration, an eddy current is easily generated in the conductor plate, and it becomes possible to more effectively release the energy owned by the superconducting coil to outside the superconducting coil, when quench occurs.

According to a ninth aspect of Embodiment 1, in the magnetic field generating device according to any one of the first to eighth aspects of Embodiment 1, the unseparated conductor plate has a thickness of 3 mm or larger.

In this configuration, an eddy current is easily generated in the conductor plate, and it becomes possible to more effectively release the energy owned by the superconducting coil to outside the superconducting coil, when quench occurs.

According to a tenth aspect of Embodiment 1, in the magnetic field generating device according to any one of the first to ninth aspects of Embodiment 1, the unseparated conductor plate is formed of a material with a resistivity of $1.0 \times 10^{-9}$ $\Omega$m or less under an operating temperature of the superconducting coil.

The operating temperature of the superconducting coil refers to the temperature of the superconducting coil in a case where a specified magnetic field is generated by flowing a rated current through the superconducting coil, and allows the superconducting coil to be kept in a superconductive state.

In this configuration, an eddy current is easily generated in the conductor plate, and it becomes possible to more effectively release the energy owned by the superconducting coil to outside the superconducting coil, when quench occurs.

According to an eleventh aspect of Embodiment 1, in the magnetic field generating device according to any one of the first to tenth aspects of Embodiment 1, the unseparated conductor plate is formed of at least one material which is selected from the group consisting of oxygen-free copper, pure aluminum, pure gold, and pure silver and has a residual resistance ratio of 100 or more.

In this configuration, an eddy current is easily generated in the conductor plate, and it becomes possible to more effectively release the energy owned by the superconducting coil to outside the superconducting coil, when quench occurs.

According to a twelfth aspect of Embodiment 1, in the magnetic field generating device according to any one of the first to eleventh aspects of Embodiment 1, the unseparated conductor plate is formed of at least one material selected from the group consisting of oxygen-free copper with a purity degree of 99.95% or more and pure aluminum with a purity degree of 99.95% or more.

In this configuration, an eddy current is easily generated in the conductor plate, and it becomes possible to more effectively release the energy owned by the superconducting coil to outside the superconducting coil, when quench occurs.

Hereinafter, it is assumed that the magnetic field generating device is continuously supplied with a voltage and a current from outside the magnetic field generating device. However, the magnetic field generating device may not be continuously supplied with a voltage and a current from outside the magnetic field generating device, but field windings may be used in a permanent current mode.

Example 1

FIG. 1 is a view showing the exemplary schematic configuration of a magnetic field generating device according to Example 1 of Embodiment 1.

The magnetic field generating device 1 according to Example 1 includes a superconducting coil 31, an unseparated conductor plate 32, and a protection circuit 4.

The superconducting coil 31 is formed by winding a superconductive wire material. The superconductive wire material may be, for example, a bismuth based superconductive wire material or a yttrium based superconductive wire material. The superconducting coil 31 is cooled by a cooling mechanism (not shown). As cooling medium used to cool the superconducting coil 31, liquid nitrogen, liquid helium, a low-temperature helium gas, etc., may be used. The superconducting coil 31 is cooled to, for example, about 30K by use of the cooling medium flowing through a cooling medium passage and thereby is placed in a superconductive state.

The unseparated conductor plate 32 comprises an electric conductor. The unseparated conductor plate 32 is placed such that the unseparated conductor plate 32 is insulated from the superconducting coil 31 and is adjacent to the superconducting coil 31 in the winding axis (center axis) direction of the superconducting coil 31, and one of the main surfaces of the unseparated conductor plate 32 faces the superconducting coil 31. In the example of FIG. 1, when the winding axis direction of the superconducting coil 31 is a vertical direction, the unseparated conductor plates 32 are placed such that one unseparated conductor plate 32 is on each of the upper and lower sides of the superconducting coil 31.

In the example of FIG. 1, when the winding axis direction of the superconducting coil 31 is the vertical direction, the conductor plates 32 are placed such that one conductor plate 32 is located on at least one of the upper and lower sides of the superconducting coil 31. In the example of FIG. 1, the conductor plates 32 are placed such that one conductor plate 32 is located on the upper side of the superconducting coil 31 and one conductor plate 32 is located on the lower side of the superconducting coil 31. Alternatively, one conductor plate 32 may be placed on the upper side of the superconducting coil 31 and the conductor plate 32 may not be placed on the lower side of the superconducting coil 31. Or, one conductor plate 32 may be placed on the lower side of the superconducting coil 31 and the conductor plate 32 may not be placed on the upper side of the superconducting coil 31.

A plurality of conductor plates 32 may be placed on one of the upper and lower sides of the superconducting coil 31 provided that the energy owned by the superconducting coil can be more quickly released to outside the superconducting coil, when the quench occurs. For example, the plurality of conductor plates 32 may be stacked together in contact with each other in the winding axis direction of the superconducting coil 31. Or, the conductor plate 32 may be separated when viewed from the winding axis direction of the superconducting coil 31.

FIG. 2A is a plan view showing the exemplary schematic configuration of the superconducting coil of the magnetic field generating device according to Example 1 of Embodiment 1. FIG. 2B is a plan view showing the exemplary schematic configuration of the conductor plate of the magnetic field generating device according to Example 1 of Embodiment 1.

As shown in FIGS. 2A and 2B, the unseparated conductor plate 32 covers the entire surface of the superconducting coil 31, when viewed from the winding axis direction of the superconducting coil 31. In the example of FIG. 2, the unseparated conductor plate 32 has the same shape as that of the contour of the superconducting coil 31, when viewed from the winding axis direction of the superconducting coil 31. Specifically, in the example of FIG. 2, the width $W_1$ of the superconducting coil 31 is equal to the width $W_2$ of the conductor plate 32 ($W_1=W_2$), and the depth $D_1$ of the superconducting coil 31 is equal to the depth $D_2$ of the conductor plate 32 ($D_1=D_2$).

The shape of the conductor plate 32 is not particularly limited. The shape of the conductor plate 32 may be, for example, a disc shape, a ring shape having a hollow space, a plate shape, or a coil shape. Any shape of the conductor plate 32 may be employed provided that a current is generated by an inductive electromotive force when the magnetic field generated in the superconducting coil 31 changes, at the occurrence of the quench. In the example of FIG. 2, the superconducting coil 31 has a race truck type.

In the present example, the unseparated conductor plate 32 has a flat plate shape which does not have a groove over the entire surface. In the case where the unseparated conductor plate 32 has a race truck shape, like the present example, it may not have a groove extending in a direction crossing a short-side direction (depth direction). In this configuration, since the width of a path through which an eddy current generated in the conductor plate 32 flows is not reduced, the eddy current can be generated effectively.

In the present example, the material of the conductor plate 32 may be, for example, a material with a resistivity of $1.0\times10^{-9}$ Ωm or less under the operating temperature of the superconducting coil. The material of the conductor plate 32 may be, for example, at least one material selected from the group consisting of copper, aluminum, gold, and silver and having a residual resistance ratio of 100 or more. The material of the conductor plate 32 may be, for example, at least one material selected from the group consisting of copper with a purity degree of 99.95% or more and aluminum having a purity degree of 99.95% or more. The conductor plate 32 formed of the material with a low electric resistance allows the eddy current to be generated effectively.

In the present example, the thickness of the unseparated conductor plate 32 is as large as or larger than 3/10 of the thickness of the superconducting coil 31 in the winding axis direction.

In the present example, the thickness of the unseparated conductor plate 32 is 3 mm or larger. Specifically, the thickness of the superconducting coil 31 may be set to 10 mm, and the thickness of the unseparated conductor plate 32 may be set to 3 mm. The conductor plate 32 with an adequate thickness allows the eddy current to be generated effectively.

The protection circuit 4 is connected in parallel with the superconducting coil 31, and serves to attenuate a current flowing through the superconducting coil 31. The protection circuit 4 may include a resistor. The protection circuit 4 may include a diode circuit in which one or more diodes connected in series are placed with a polarity that causes the current of the superconducting coil to flow back. Or, the protection circuit 4 may include a diode circuit in which two sets of one or more diodes connected in series are connected in parallel with each other with opposite polarities. Or, the protection circuit 4 may include a diode and a resistor which are connected in series. Or, the protection circuit 4 may include the diode circuit in which two sets of one or more diodes connected in series are connected in parallel with each other with opposite polarities, and a resistor connected in series with this diode circuit.

Figure 3:
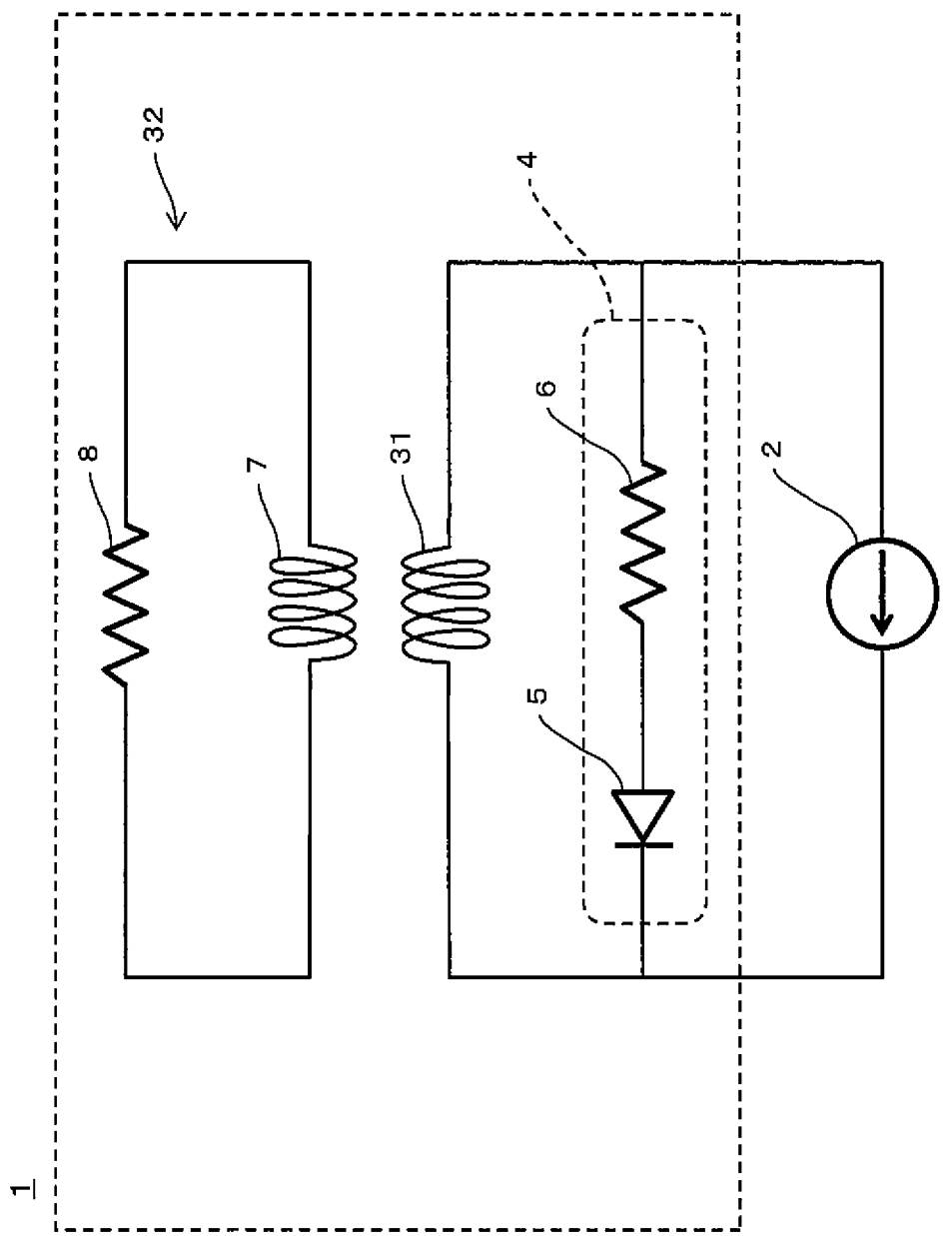
FIG. 3 is an example of an equivalent circuit diagram of the magnetic field generating device of FIG. 1.

FIG. 3 is an example of an equivalent circuit diagram of the magnetic field generating device of FIG. 1. Hereinafter, the operation of the magnetic field generating device of the present example will be described with reference to FIG. 3. The magnetic field generating device 1 operates in a state in which it is connected to a constant current power supply 2. In the example of FIG. 3, the two conductor plates 32 in the example of FIG. 1 are drawn simply as an integrated conductor plate 32.

When the magnetic field generating device starts the operation, the cooling mechanism (not shown) cools the superconducting coil 31. When the superconducting coil 31 is placed in a superconductive state, a connection switch (not shown) connecting the constant current power supply 2 to the magnetic field generating device 1 is turned ON, and a current is supplied to the superconducting coil 31, thereby a magnetic field to be generated. The magnitude of the current may be, for example, about 200 A.

In a state in which the superconductive state is implemented and the magnetic field is generated as described above, quench (normal conduction transition) may sometimes occur in a portion of the superconducting coil 31. When the quench occurs, a quench detector (not shown) detects the quench, and the constant current power supply 2 is disconnected from the magnetic field generating device 1. When the superconducting coil 31 is used in a permanent current mode, a switch (not shown) performs switching to flow a current through the protection circuit 4.

When the constant current power supply 2 is disconnected from the magnetic field generating device 1, the switch performs switching, etc., a current inside the magnetic field generating device 1 flows through a circuit including the superconducting coil 31 and the protection circuit 4. In the example of FIG. 3, the protection circuit 4 includes a single diode 5 and a single resistor 6. The current inside the magnetic field generating device 1 is in a large part consumed by the resistor 6, and thereby is rapidly reduced. Because of such a rapid reduction of the current, the magnitude of the magnetic field generated in the superconducting coil 31 is rapidly changed.

In response to such a rapid change in the magnetic field, an eddy current is generated in the conductor plate 32. In other words, the conductor 32 serves as an induction coil 7 which generates an induction current in response to a change in the magnetic field generated in the superconducting coil 31. The eddy current, i.e., the induction current is consumed by the electric resistance of the conductor plate 32 while generating Joule heat, inside the conductor plate 32. In other words, the conductor plate 32 serves as a resistor 8 which consumes the induction current.

Through the above described process, the energy accumulated inside the magnetic field generating device 1 is transferred instantly from the circuit including the superconducting coil 31 and the protection circuit 4, to the conductor plate 32. Therefore, when the quench occurs, the energy owned by the superconducting coil can be released to outside the superconducting coil more quickly. As a result, damage and the like to the superconducting coil can be effectively suppressed.

It is estimated that the conductor plate 32 is heated by the heat generation of the conductor plate 32 by Joule heat, and thereby the superconducting coil 31 is heated uniformly. When such an advantage is achieved, damage and the like to the superconducting coil 31, which is caused by local quench, can be suppressed more effectively. Conventionally, to heat the superconducting coil 31, it is necessary to additionally provide a heating device such an electric heater (Patent Literature 1, 2, etc.). The conductor plate 32 of the present example generates heat for itself by Joule heat generated by the eddy current. Therefore, the additional heating device need not be used. In brief, the conductor plate 32 need not include the electric heater.

[Simulation Example]

Hereinafter, regarding the effect of reducing the current by the conductor plate, the result of study performed using a simulation will be described.

Figure 4:
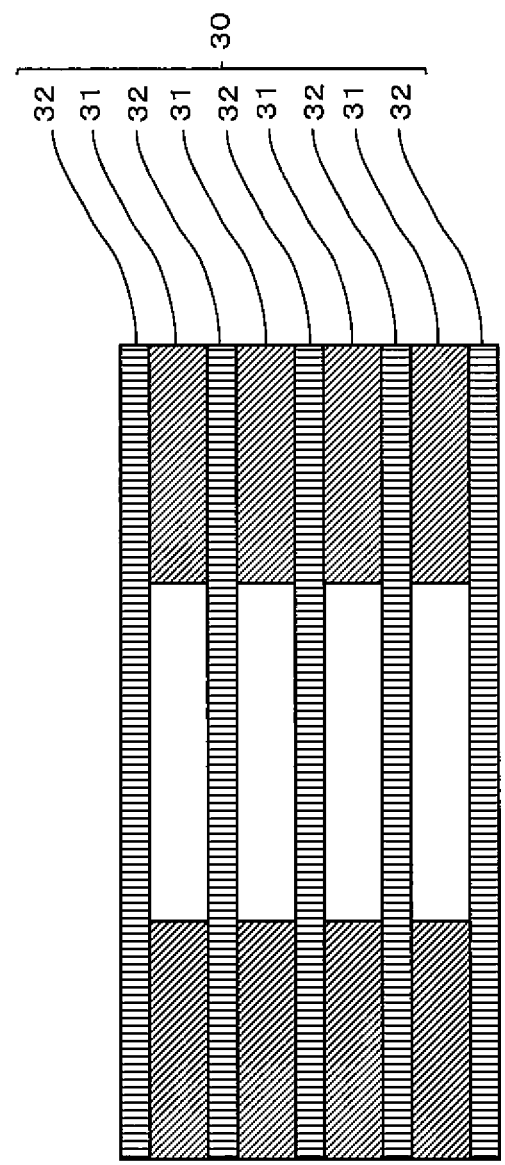
FIG. 4 is a cross-sectional view showing the schematic configuration of a superconducting coil-conductor plate assembly of the magnetic field generating device according to a simulation example of Embodiment 1.
Figure 5:
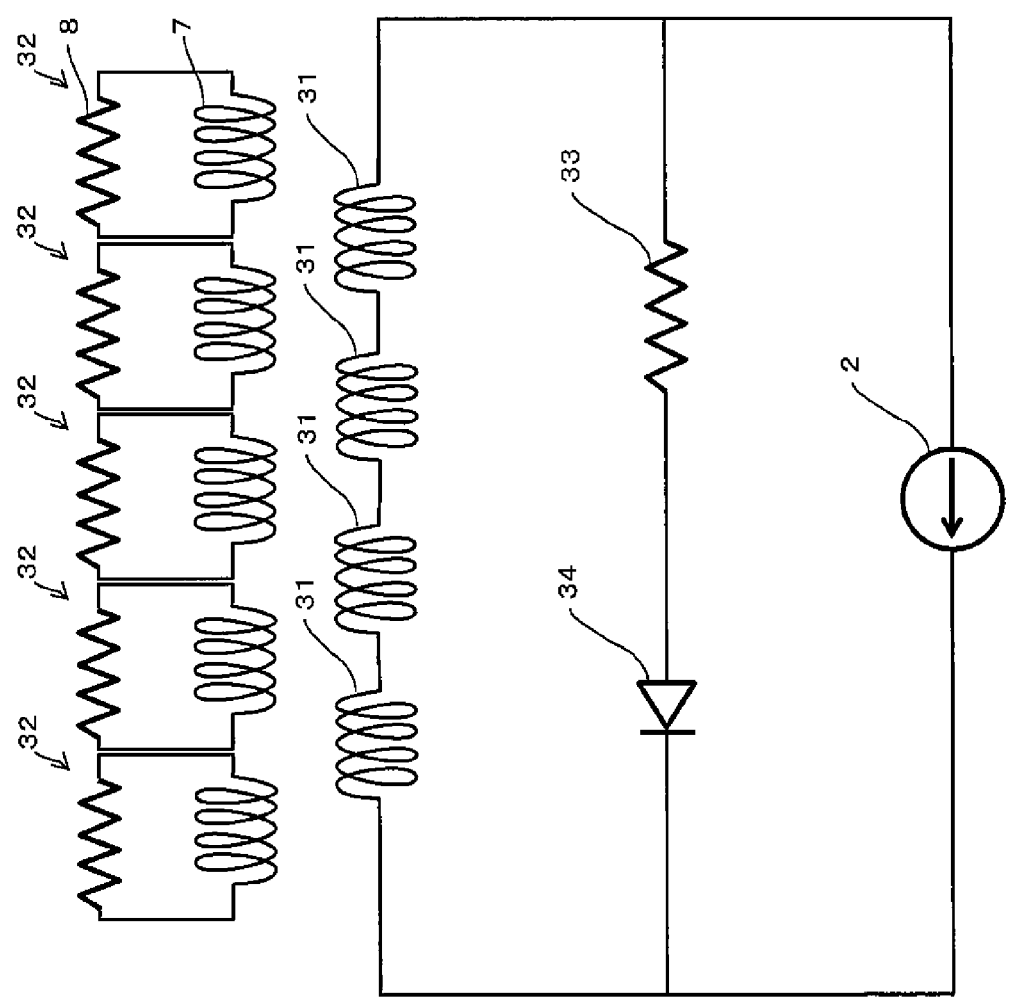
FIG. 5 is an equivalent circuit diagram of the magnetic field generating device according to the simulation example of Embodiment 1.

FIG. 4 is a cross-sectional view showing the schematic configuration of a superconducting coil-conductor plate assembly of the magnetic field generating device according to a simulation example of Embodiment 1. FIG. 5 is an equivalent circuit diagram of the magnetic field generating device according to the simulation example of Embodiment 1. In FIGS. 5 and 3, the same components are designated by the same reference symbols and names, and will not be described in detail.

In the present simulation, a plurality of superconducting coils 31, i.e., four superconducting coils 31 (width: 1800 mm, depth: 300 mm, thickness: 10 mm) (total inductance of the four coils=14[H]) were stacked together and connected in series such that their winding axis directions conformed to each other, and five conductor plates 32 (width: 1800 mm, depth: 300 mm, thickness: 4 mm, resistivity: $2.22\times10^{-10}$ Ωm [=resistivity of oxygen-free copper in 30K]) were stacked together such that one conductor plate 32 was placed between adjacent ones of the plurality of superconducting coils 31 and on each of the outer sides of the superconducting coils 31 at both ends. Thus, a superconducting coil-conductor plate assembly 30 was formed. The protection circuit was configured such that the resistor 33 had a resistance of 1.5Ω, and 15 diodes (rectifying silicon diodes, forward voltage: 0.7V) were connected in series as the diodes 34 such that their polarities conformed to the direction shown in FIG. 5. A device model "magnetic field generating device including conductor plate" was created by connecting the superconducting coil-conductor plate assembly 30 in series with the protection circuit.

A device model "magnetic field generating device including no conductor plate" was created by omitting only all of the conductor plates from the above described device model without changing the positional relationship of the superconducting coils.

Analysis conditions were such that a current in a superconductive state was 100 A, a temperature in the superconductive state was 30K, and a power supply was cut-off at time 0 sec. As a simulation program, Magnet 64 bit Version 7.1 produced by infolytica Co. Ltd, was used.

Figure 6:
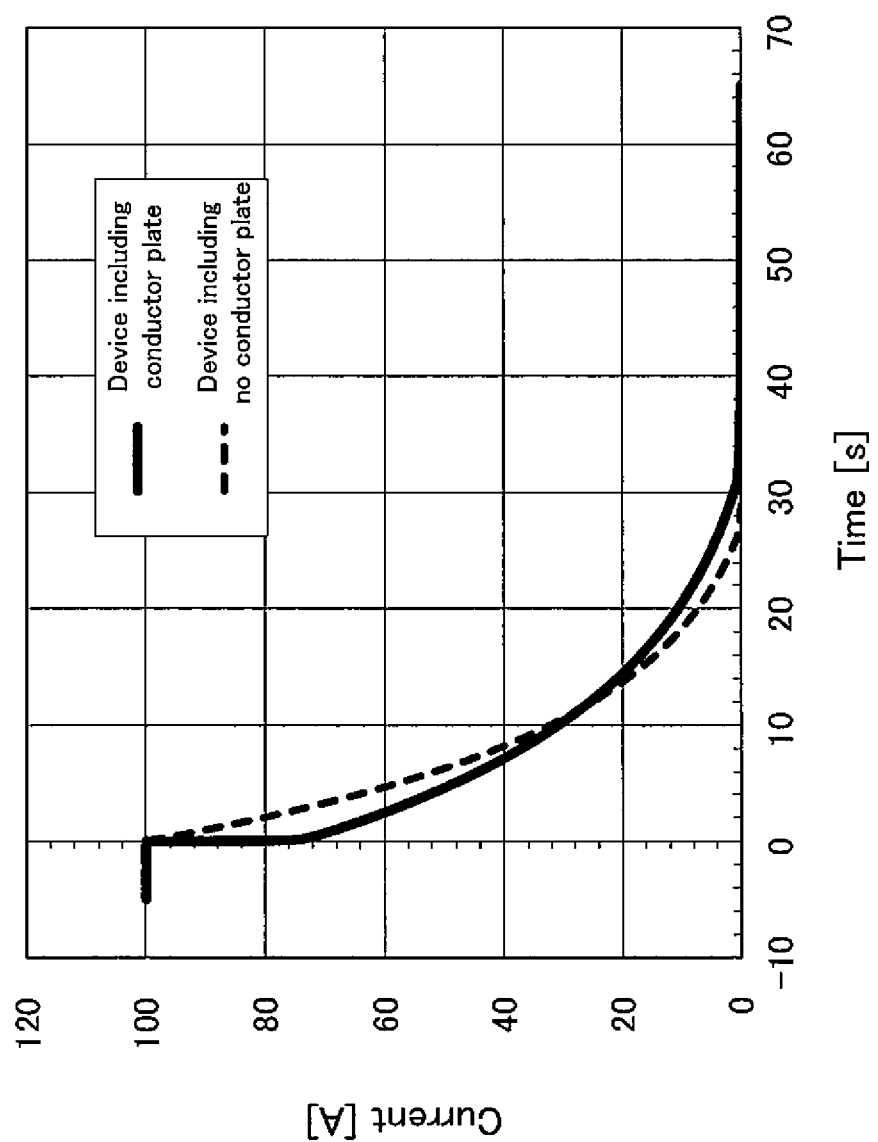
FIG. 6 is a graph showing a comparison of a change in a current flowing through a superconducting coil, which occurs with time, when quench occurs, between a case where the magnetic field generating device includes the conductor plate and a case where the magnetic field generating device does not include the conductor plate, in the magnetic field generating device according to the simulation example of Embodiment 1.

FIG. 6 is a graph showing a comparison of a change in a current flowing through the superconducting coil, which occurs with time, when quench occurs, between a case where the magnetic field generating device includes the conductor plate and a case where the magnetic field generating device does not include the conductor plate, in the magnetic field generating device according to the simulation example of Embodiment 1.

As can be seen from FIG. 6, in the device model "magnetic field generating device including no conductor plate", the current decreased gradually with time, while in the device model "magnetic field generating device including conductor plate", the current decreased instantly to about 70 A at time (time=0 sec) when the quench occurred, and thereafter decreased gradually. That is, it was found out that by providing the conductor plates, a maximum current value was decreased instantly when the quench occurred, and thereby the heat generated in a quench region could be reduced effectively, thereby allowing the energy (current energy) owned by the superconducting coils to be released more quickly to outside (conductor plates) of the superconducting coils.

Embodiment 2

A superconducting rotary machine according to a first aspect of Embodiment 2 is a superconducting rotary machine including the magnetic field generating device according to any one of the first to twelfth aspects of Embodiment 1, and comprises a rotary shaft, and a superconducting coil-conductor plate assembly which is fastened to the rotary shaft, and includes a superconducting coil and an unseparated conductor plate, wherein the superconducting coil constitutes a field winding of the superconducting rotary machine, the superconducting rotary machine further comprising a power supply for supplying a current to the superconducting coil.

A superconducting rotary machine according to a second aspect of Embodiment 2 is a superconducting rotary machine according to the first aspect of Embodiment 2, in which the protection circuit is provided in a stationary section and connected in parallel with the superconducting coil with respect to the power supply, to protect the superconducting coil.

A superconducting rotary machine according to a third aspect of Embodiment 2 is a superconducting rotary machine according to the first aspect of Embodiment 2, in which the protection circuit is provided in the rotary shaft and connected in parallel with the superconducting coil with respect to the power supply, to protect the superconducting coil.

A superconducting rotary machine according to a fourth aspect of Embodiment 2 is a superconducting rotary machine according to the third aspect of Embodiment 2, in which the protection circuit includes a plurality of pole protection circuits connected in parallel with superconducting coils of a plurality of field poles of the superconducting rotary machine, to protect the superconducting coils, respectively, and an internal protection circuit connected in parallel with both ends of a series path in which all of the superconducting coils of the field poles are connected in series, to protect the superconducting coils.

A superconducting rotary machine according to a fifth aspect of Embodiment 2 is a superconducting rotary machine according to the first aspect of Embodiment 2, in which the protection circuit includes a first protection circuit which is provided in the rotary shaft and connected in parallel with the superconducting coil with respect to the power supply, to protect the superconducting coil, and a second protection circuit which is provided in the stationary section and connected in parallel with the superconducting coil with respect to the power supply, to protect the superconducting coil.

A superconducting rotary machine according to a sixth aspect of Embodiment 2 is a superconducting rotary machine according to the fifth aspect of Embodiment 2, in which the first protection circuit includes a plurality of pole protection circuits connected in parallel with superconducting coils of a plurality of field poles of the superconducting rotary machine, to protect the superconducting coils, and an internal protection circuit connected in parallel with both ends of a series path in which all of the superconducting coils of the field poles are connected in series, to protect the superconducting coils.

A superconducting rotary machine according to a seventh aspect of Embodiment 2 is a superconducting rotary machine including the magnetic field generating device according to any one of the first to twelfth aspects of Embodiment 1, and comprises a rotary shaft, and a superconducting coil-conductor plate assembly which is fastened to the rotary shaft, and includes a superconducting coil and an unseparated conductor plate, in which the superconducting coil constitutes a field winding of the superconducting rotary machine, the superconducting rotary machine further comprising a power supply member, and a power supply provided in the stationary section and configured to supply a current to the superconducting coil via the power supply member, in which the protection circuit includes a first protection circuit which is provided in the rotary shaft and connected in parallel with the superconducting coil with respect to the power supply, to protect the superconducting coil, and a second protection circuit which is provided in the stationary section and connected in parallel with the superconducting coil with respect to the power supply, to protect the superconducting coil.

In this configuration, the superconducting coil can be protected when a problem occurs in the power supply member as well as when the quench occurs.

A superconducting rotary machine according to an eighth aspect of Embodiment 2 is a superconducting rotary machine according to the seventh aspect of Embodiment 2, in which the first protection circuit includes a plurality of pole protection circuits connected in parallel with superconducting coils of a plurality of field poles of the superconducting rotary machine, to protect the superconducting coils, respectively, and an internal protection circuit connected in parallel with both ends of a series path in which all of the superconducting coils of the field poles are connected in series.

In this configuration, even when a disconnection occurs in the vicinity of the superconductive field pole, the superconducting coil can be protected.

The superconducting rotary machine of the present embodiment includes, for example, a superconducting motor and a superconducting generator.

In description of the examples, "center axis", "peripheral surface", "circumferential direction", and "radial direction" refer to the center axis, peripheral surface, circumferential direction, and radial direction of a rotary shaft unless otherwise noted. Also, for easier explanation, a center axis direction will be referred to a forward and rearward direction, a side at which driving power is input and output will be referred to a forward side, and a side at which electric power or a cooling medium (refrigerant) is input and output will be referred to as a rearward side.

Hereinafter, in the examples, a field rotor will be described. The field rotor operates in a state in which it is stored in a stator armature (not shown). The stator armature will not be described specifically, because its configuration is well-known.

Regarding the examples described below, the components which may be the same components are designated by the same reference symbols and names, and those in one example will be described in detail, but those in the other examples will be not described in detail repeatedly.

Example 1

Figure 7:
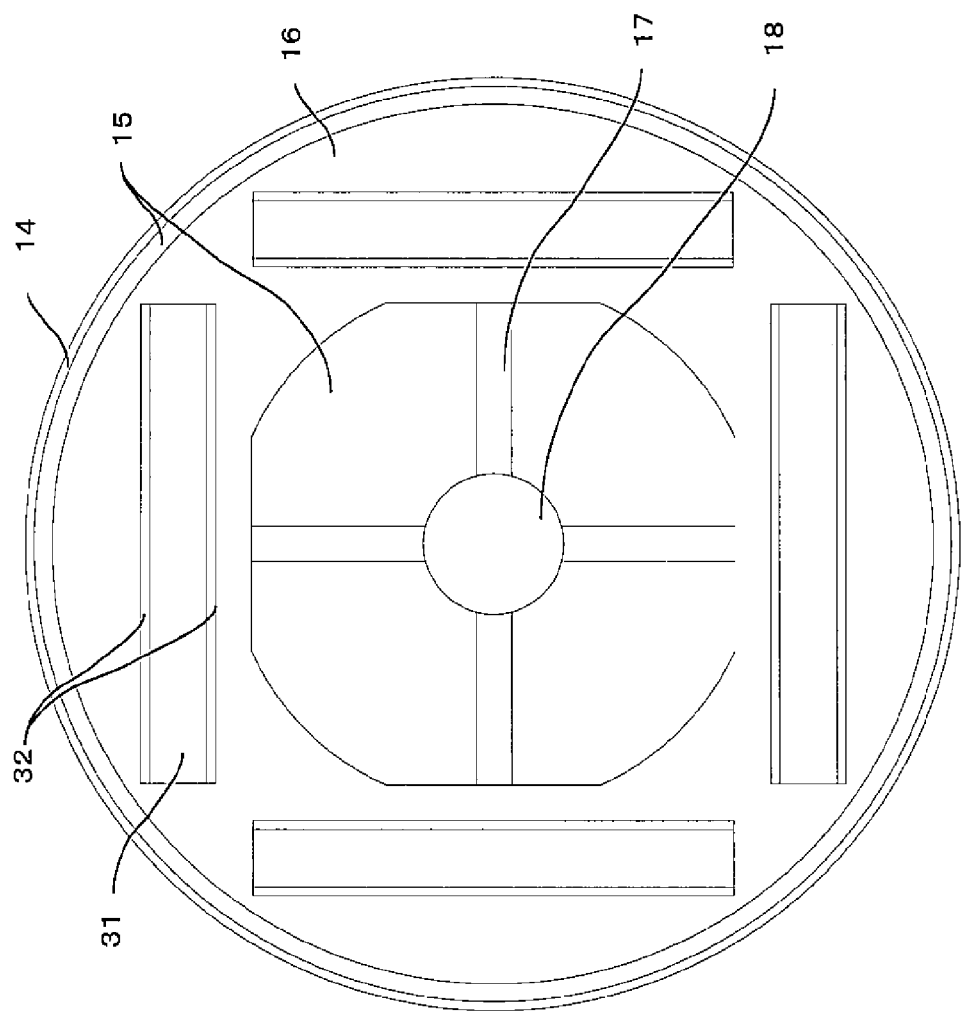
FIG. 7 is a cross-sectional view showing the schematic configuration of a field rotor of a superconducting rotary machine according to Example 1 of Embodiment 2.
Figure 8:
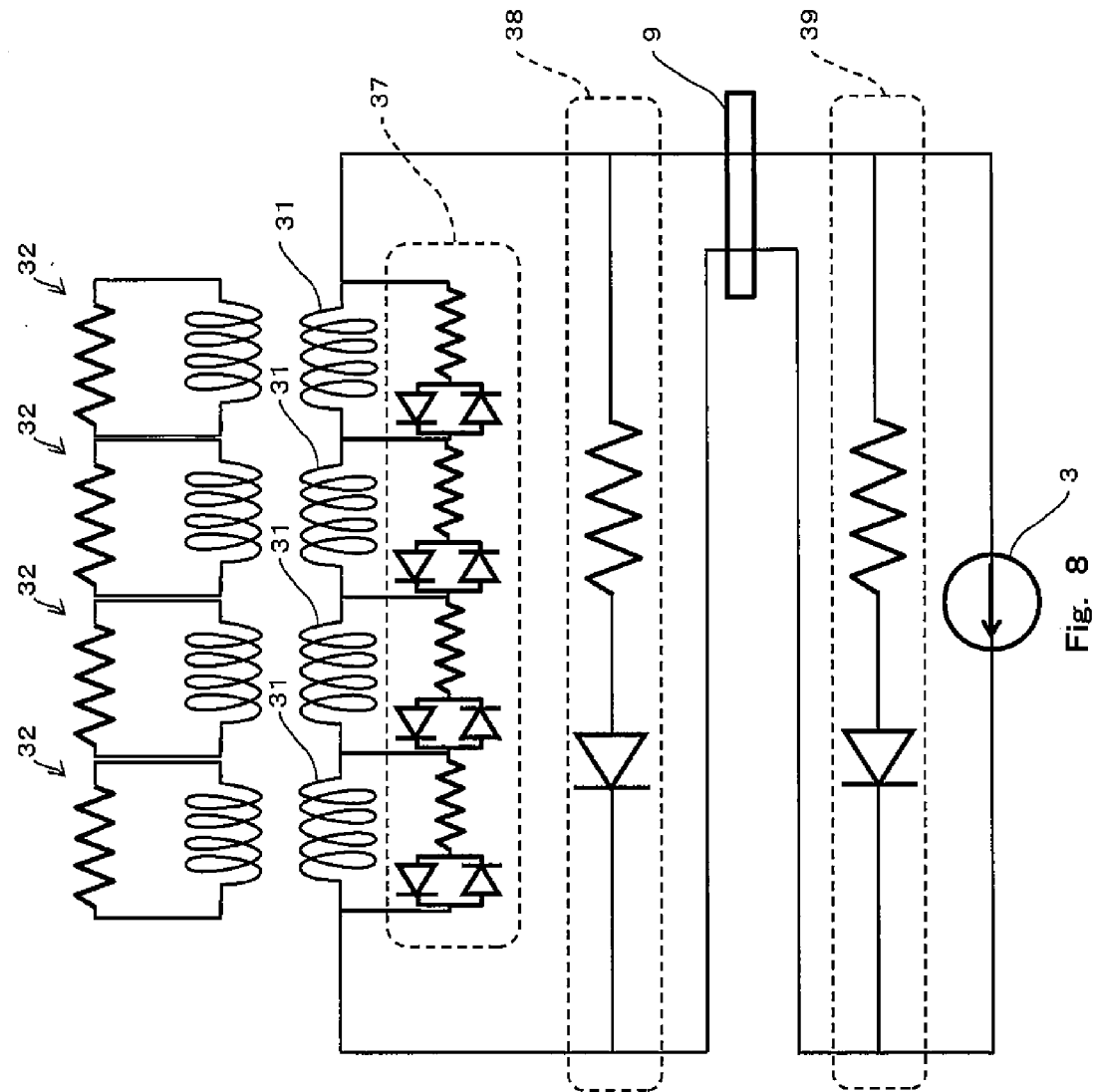
FIG. 8 is an example of an equivalent circuit diagram of the field rotor of the superconducting rotary machine according to Example 1 of Embodiment 2.

FIG. 7 is a cross-sectional view showing the schematic configuration of a field rotor of a superconducting rotary machine according to Example 1 of Embodiment 2. FIG. 8 is an example of an equivalent circuit diagram of the field rotor of the superconducting rotary machine according to Example 1 of Embodiment 2.

A power supply 3 serves to supply electric power to the superconducting coils 31 of the field poles. The power supply 3 may be, for example, a DC power supply or AC power supply provided in a stationary section, a DC excitation unit or brushless excitation unit provided in a rotary section.

A power supply member 9 is a means which supplies electric power from the power supply to the superconducting coils of the field poles, as a current. As the power supply member 9, for example, a slip ring, a non-contact power supply means, etc., may be used.

A room temperature damper 14 is formed of, for example, a composite member of a SUS 316 stainless steel and oxygen-free copper. The room temperature damper 14 is air-tightly connected to the front and rear end portions of a rotary shaft structural member 16 (not shown). To cool the superconducting coils 31 during the operation (running) of the superconducting rotary machine, the interior of the room temperature damper 14 is placed in a vacuum state (extremely low-pressure state).

A vacuum heat insulating layer 15 is a vacuum region formed between the room temperature damper 14 and the rotary shaft structural member 16, and inside the rotary shaft structural member 16.

The rotary shaft structural member 16 may be formed of, for example, SUS316 stainless steel, nickel group alloy or fiber-reinforcing plastic. The rotary shaft structural member 16 retains four superconducting coils 31 therein.

A conduction cooling member 17 is capable of cooling the superconducting coil by thermoelectric conduction cooling.

A cooling mechanism 18 serves to flow a cooling medium (refrigerant) for cooling the superconducting coils 31.

Pole protection circuits 37 are provided in the rotary shaft 10 (inside the field rotor 100) and connected in parallel with the superconducting coils 31 of the plurality of field poles of the superconducting rotary machine, respectively, to protect the superconducting coils 31. The pole protection circuit 37 may include a resistor. The pole protection circuit 37 may include a diode circuit in which one or more diodes are connected in series such that their polarities conform to each other in a direction in which a current of the superconducting coils flows back. The pole protection circuit 37 may include a diode circuit in which two sets of one or more diode circuits connected in series such that their polarities conform to each other are connected in parallel with each other in such a manner that the polarities of the two sets of diode circuits are opposite to each other. The pole protection circuit 37 may include the diode circuit in which one or more diodes are connected in series such that their polarities conform to each other in the direction in which a current of the superconducting coils flows back, and a resistor connected in series with this diode circuit. The protection circuit 37 may include the diode circuit in which two sets of one or more diode circuits connected in series such that their polarities conform to each other are connected in parallel with each other in such a manner that the polarities of the two sets of diode circuits are opposite to each other, and a resistor connected in series with this diode circuit.

An internal protection circuit 38 is provided in the rotary shaft 10 (inside the field rotor 100) and connected in parallel with both ends of a series path in which all of the superconducting coils 31 of the field poles are connected in series, to protect the superconducting coils 31. The series path connects all of the superconducting coils 31 in series in a case where all of the superconducting coils 31 of the field poles are connected in series. Specifically, for example, the internal protection circuit 38 may be provided inside a cylindrical space extending through the rotary shaft 10 in the center axis direction. The internal protection circuit 38 may include the resistor. The internal protection circuit 38 may include a diode circuit in which one or more diodes are connected in series such that their polarities conform to each other in a direction in which a current of the superconducting coils flows back. The internal protection circuit 38 may include the diode circuit in which one or more diodes are connected in series such that their polarities conform to each other in a direction in which a current of the superconducting coils flows back, and a resistor connected in series with this diode circuit.

An external protection circuit 39 is provided in a stationary section (section which is not rotated along with the field rotor 100 and is fixed) and connected in parallel with the superconducting coils 31 with respect to the power supply 3, to protect the superconducting coils 31. The external protection circuit 39 may include a resistor. The external protection circuit 39 may include ae diode circuit in which one or more diodes are connected in series such that their polarities conform to each other in a direction in which a current of the superconducting coils flows back. The external protection circuit 39 may include a diode circuit in which one or more diodes are connected in series such that their polarities conform to each other in a direction in which a current of the superconducting coils flows back, and a resistor connected in series with this diode circuit.

The field rotor of the superconducting rotary machine according to the present example includes the pole protection circuit, the internal protection circuit, and the external protection circuit. The field rotor may include only one of the pole protection circuit, the internal protection circuit, and the external protection circuit. The field rotor may include only two of the pole protection circuit, the internal protection circuit, and the external protection circuit.

The above stated diode has a voltage threshold in a forward direction of the polarity. The diode flows therethrough a minute amount of current when a voltage which is equal to or lower than the voltage threshold is applied to the diode. Because of such characteristics, each protection circuit incorporating the diode circuit makes it possible to suppress the current application to the pole protection circuit and heat generation due to the current application, during normal excitation/demagnetization in which the current is increased or decreased in a range between 0 A and a maximum operating current to excite and demagnetize the field poles. On the other hand, in a case where urgent demagnetization becomes necessary, for example, a case where quench is detected, a voltage which is much higher than the threshold of the forward voltage of the diode is applied to the protection circuit, a current flows from the superconducting coils to the protection circuit, which can quickly absorb and consume the energy owned by the superconducting coils.

In the field rotor in which the internal protection circuit or the external protection circuit including the diode circuit in which one or more diodes are connected in series such that their polarities conform to each other in the direction in which a current of the superconducting coils flows back, it becomes possible to inhibit the current from being applied to the internal protection circuit or the external protection circuit and suppress the current application to the internal protection circuit or the external protection circuit and the heat generation in the internal protection circuit or the external protection circuit, due to the current application, during normal excitation in which the current is increased from 0 A to the maximum operating current.

In the diode circuit of the pole protection circuit, in a case where the diodes are placed with a polarity in the same direction as the direction in which the current flows through the superconducting coils, and an event that an increase in a resistance value such as quench, disconnection, etc., occurs, in the vicinity of the superconducting coils, commutation in which a current shifts from the superconducting coils to the pole protection circuit takes place. Thus, it becomes possible to avoid that the energy of all of the superconducting coils is consumed in a quench region and a disconnection region.

In the field rotor including at least one of the pole protection circuit, the internal protection circuit, and the external protection circuit, the conductor plate and at least one of the pole protection circuit, the internal protection circuit, and the external protection circuit absorb and consume the energy of the superconducting coils so that the superconducting coils can be protected. The conductor plate can alleviate a load placed on the pole protection circuit, the internal protection circuit, and the external protection circuit. As a result, the pole protection circuit, the internal protection circuit, and the external protection circuit can be reduced in size and cost.

In the field rotor including at least one of the pole protection circuit and the internal protection circuit, even when a problem occurs in a current supply means, the conductor plate and at least one of the pole protection circuit and the internal protection circuit absorb and consume the energy of the superconducting coils so that the superconducting coils can be protected. The conductor plate can alleviate a load placed on the pole protection circuit and the internal protection circuit. As a result, the pole protection circuit and the internal protection circuit can be reduced in size and cost.

In the field rotor including at least one of the pole protection circuit and the internal protection circuit, and the external protection circuit, the conductor plate, at least one of the pole protection circuit and the internal protection circuit, and the external protection circuit, allow the energy of the superconducting coils to be dispersed, absorbed, and consumed. A load placed on the pole protection circuit, the internal protection circuit, and the external protection circuit, can be alleviated. As a result, the pole protection circuit, the internal protection circuit, and the external protection circuit can be reduced in size and cost. The pole protection circuit, the internal protection circuit, and the external protection circuit can absorb and consume the energy of the superconducting coils in a dispersed manner. Since a load placed on the respective circuits can be alleviated, and these circuits can be reduced in size. In this circuit configuration, it is easy to design a protection circuit which can reduce a current attenuation time to a shortest possible level under a voltage which is equal to or lower than an inter-earth withstand voltage of the superconducting coils.

Example 2

Figure 9:
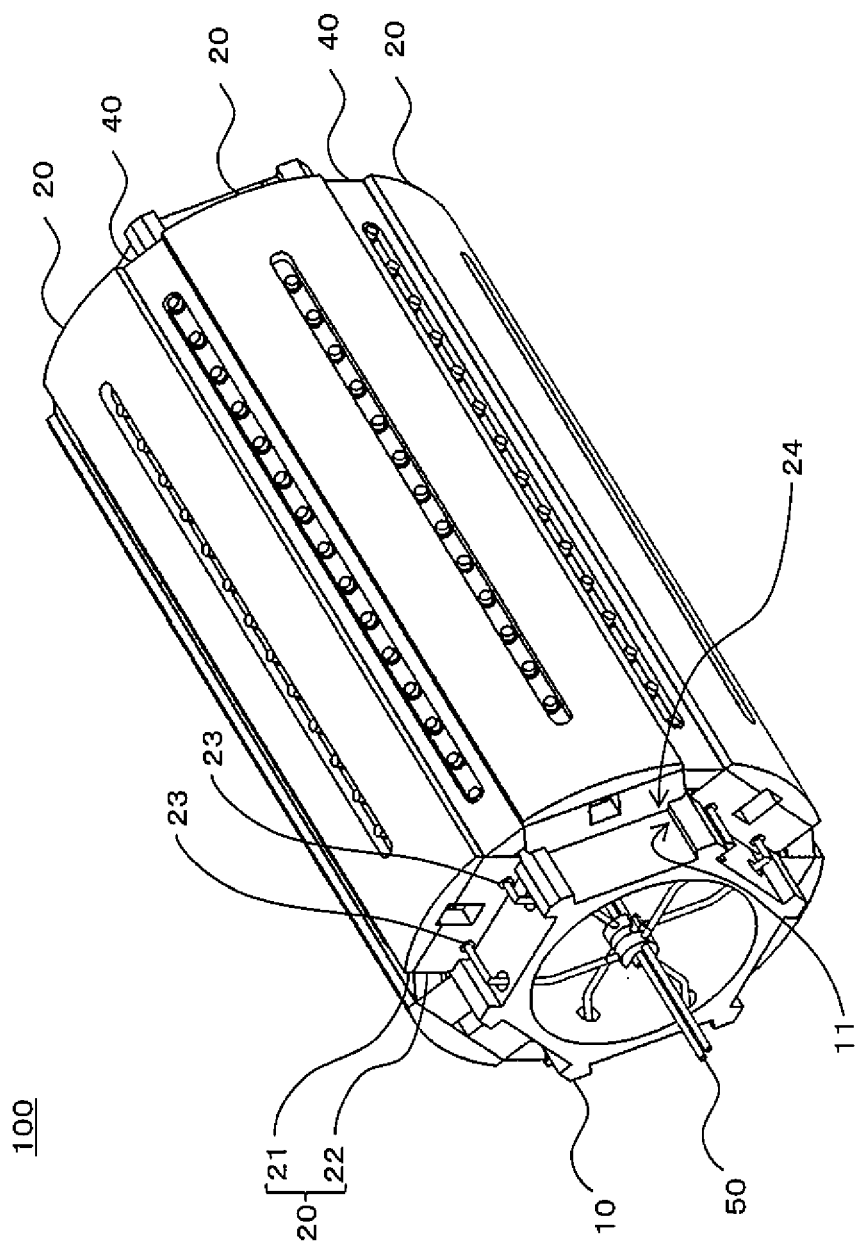
FIG. 9 is a perspective view showing the schematic configuration of a field rotor of a superconducting rotary machine according to Example 2 of Embodiment 2.
Figure 10:
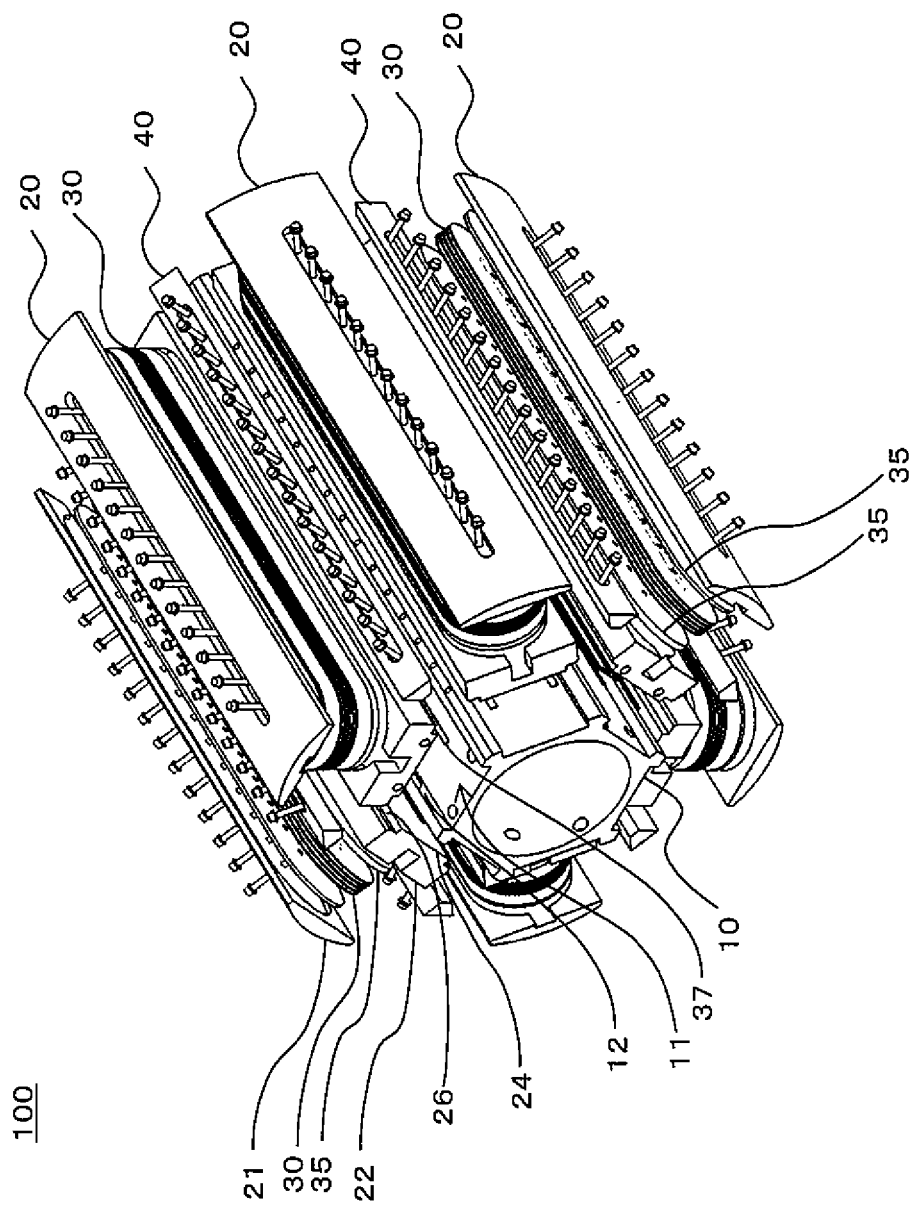
FIG. 10 is an exploded view showing the schematic configuration of the field rotor of the superconducting rotary machine according to Example 2 of Embodiment 2.
Figure 11:
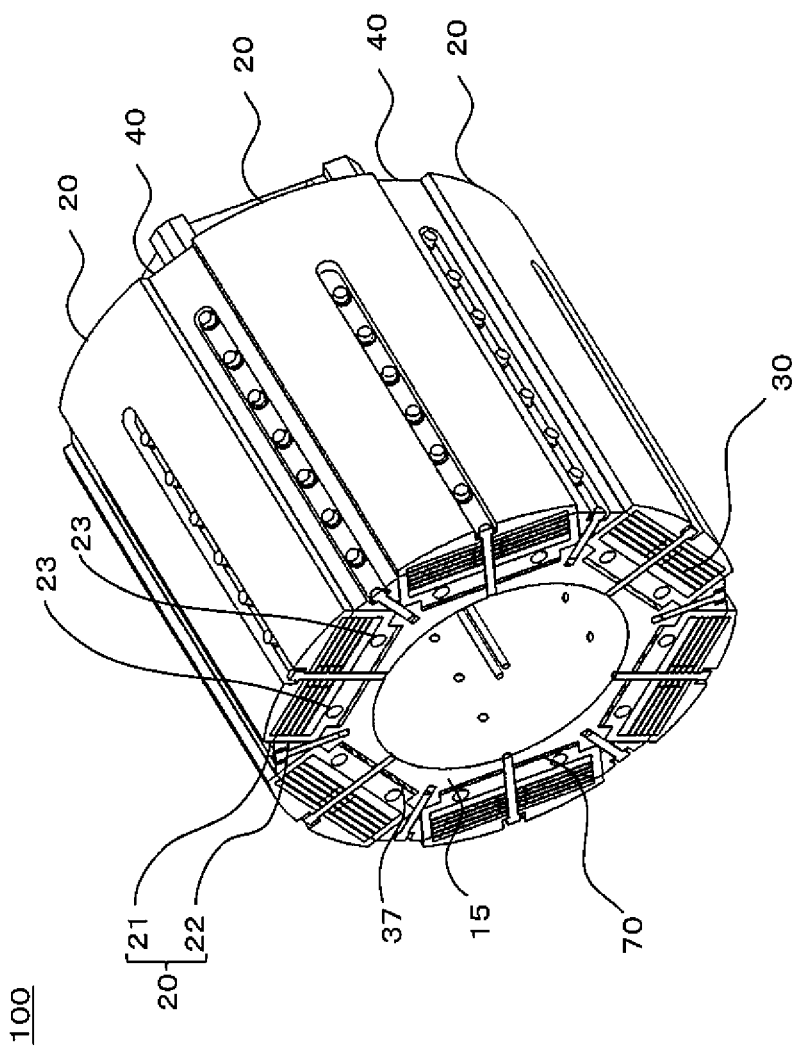
FIG. 11 is a perspective view showing the cross-section of the schematic configuration of the field rotor of the superconducting rotary machine according to Example 2 of Embodiment 2.

FIG. 9 is a perspective view showing the schematic configuration of a field rotor of a superconducting rotary machine according to Example 2 of Embodiment 2. FIG. 10 is an exploded view showing the schematic configuration of the field rotor of the superconducting rotary machine according to Example 2 of Embodiment 2. FIG. 11 is a perspective view showing the cross-section of the schematic configuration of the field rotor of the superconducting rotary machine according to Example 2 of Embodiment 2.

The field rotor 100 of the superconducting rotary machine according to Example 2 includes the rotary shaft 10, a plurality of coil cases 20, and a plurality of superconducting coil-conductor plate assemblies 30. The coil cases 20 extend in the center axis direction of the rotary shaft 10, have walls forming inner spaces, respectively, and are removably fastened to the peripheral surface of the rotary shaft 10. The superconducting coil-conductor plate assemblies 30 are placed in the inner spaces of the coil cases 20, respectively, and form field windings of the superconducting rotary machine, respectively.

Each of the coil cases 20 includes therein a cooling medium passage 23 through which a cooling medium used for cooling the corresponding superconducting coil-conductor plate assembly 30 flows. The cooling medium passage 23 is formed inside a portion (wall extending in the center axis direction and the circumferential direction in a location closest to the rotary shaft 10) of the wall which portion faces the rotary shaft 10.

The field rotor 100 includes low-heat contraction members 35, each of which is disposed between the inner surface of the coil case 20 and the superconducting coil-conductor plate assembly 30 stored in the coil case 20, and has a lower mean coefficient of linear thermal expansion than the coil case. The mean coefficient of linear thermal expansion of the low-heat contraction member 35 may be lower than that of the coil case and that of the superconducting coil.

The peripheral surface of the rotary shaft 10 is provided with a plurality of recesses 11 corresponding to the coil cases 20, respectively. The recesses 11 are formed to face the corresponding coil cases 20, respectively. Each of the recesses 11 has side surfaces 12 extending in the center axis direction of the rotary shaft 10. Each of the coil cases 20 has a convex portion 24 which extends in the center axis direction, protrudes toward the rotary shaft 10, and is adapted to contact and be fitted to the side surfaces 12 of the recess 11, extending in the center axis direction.

The field rotor 100 comprises a plurality of wedge members 40, each of which extends in the center axis direction and is disposed at a corresponding pair of two coil cases 20 which are adjacent in the circumferential direction of the rotary shaft such that the wedge member 40 is sandwiched between the two coil cases 20 and is in contact with the two coil cases 20.

A gap 70 is formed between each of the coil cases 20 and the peripheral surface such that the gap 70 extends in the center axis direction and circumferential direction of the rotary shaft.

The pole protection circuit 37 is provided within each of the gaps 70. The entire pole protection circuit 37 may be stored in the gap 70. Or, only a part of the pole protection circuit 37, for example, only the resistor may be stored in the gap 70.

The superconducting coil-conductor plate assembly 30 according to the present example may have the same configuration as that described with reference to FIG. 4, for example, in the simulation example of Embodiment 1, and therefore will not be described in detail repeatedly. The modified examples of Embodiment 1 may be applied to the superconducting coil-conductor plate assembly 30.

Hereinafter, the field rotor 100 of the superconducting rotary machine according to Example 2 will be described in more detail. The field rotor 100 of the present example is of a six-pole type. The field rotor of Embodiment 1 is preferably of a multipolar type. The field rotor is not limited to the six-pole field rotor, and may be, for example, a four-pole field rotor, an eight-pole field rotor, etc.

As shown in FIGS. 9 and 10, the rotary shaft 10 has a hollow and substantially hexagonal cylinder shape in which a cylindrical space extending in the center axis direction is formed. The rotary shaft 10 is made of, for example, SUS316 stainless steel which is a non-magnetic material and has an excellent low-temperature characteristic. The peripheral surface (side surface, side peripheral surface) of the rotary shaft 10 is provided with the recesses 12 with a predetermined depth, extending in the center axis direction. Each of the recesses 12 has a plurality of threaded holes to fasten the coil case 20 to the rotary shaft 10.

As shown in FIGS. 9 and 10, each of the coil cases 20 includes a box member 21 and a lid member 22. The box member 21 and the lid member 22 are provided with a recess, to store the superconducting coil-conductor plate assembly 30 therein. The superconducting coil-conductor plate assembly 30 is stored in the recess such that it is sandwiched between two low-heat contraction members 35. In the present example, the number of coil cases 20 is six and the number of superconducting coil-conductor plate assemblies 30 is six. The coil case 20 is made of, for example, SUS316 stainless steel. Each of the box member 21 and the lid member 22 has a plurality of holes into which screws are inserted, respectively, to fasten the coil case 20 to the rotary shaft 10. The superconducting coil-conductor plate assembly 30 and the low-heat contraction members 35 are placed in the recess of the box member 21, and the lid member 22 covers them, thus allowing the superconducting coil-conductor plate assembly 30 and the low-heat contraction members 35 to be stored in the coil case 20. After that, bolts and the like are inserted into the holes formed in the box member 21 and the lid member 22 and threadingly engaged with the threaded holes formed in the recess 12 of the rotary shaft 10, respectively. In this way, the coil case 20 is removably fastened to the rotary shaft 10.

The coil case 20 has the walls defining the inner space. The cooling medium passage 23 is provided inside a portion of the wall which portion faces the rotary shaft 10 such that the cooling medium passage 23 penetrates the wall linearly in the center axis direction. The thickness of the wall may be set to 15 mm or more and 30 mm or less.

As shown in FIG. 10, the low-heat contraction members 35 are disposed between the superconducting coil-conductor plate assembly 30 and the walls which face the superconducting coil-conductor plate assembly 30 in the radial direction of the rotary shaft 10, i.e., the upper and lower walls. In other words, each of the low-heat contraction members 35 is disposed between the superconducting coil-conductor plate assembly 30 and corresponding one of the two walls parallel to the peripheral surface of the rotary shaft 10. The low-heat contraction members 35 may be disposed between the superconducting coil-conductor plate assembly 30 and the walls which face the superconducting coil-conductor plate assembly 30 in the axial direction of the coil (radial direction of the rotary shaft 10). This makes it possible to improve the uniformity of the temperature distribution of the superconducting coil-conductor plate assembly 30. The low-heat contraction members 35 can be made of, for example, carbon steel, nickel steel, etc. The shape and material of the low-heat contraction members 35 may be suitably set so that the superconducting coil-conductor plate assembly 30 is retained inside the coil case 20 under a sufficient contact interface pressure, when the superconducting coil-conductor plate assembly 30 is cooled during the operation.

As shown in FIGS. 9 and 10, a cooling medium pipe 50 is coupled to the cooling medium passage 23 by joints or the like, at front and rear end portions of the coil cases 20. A cooling medium such as liquid nitrogen, liquid helium, or a low-temperature helium gas is supplied to the cooling medium passage 23 via the cooling medium pipe 50. The cooling medium pipe 50 may be formed of, for example, SUS316 stainless steel.

The cooling medium passage 23 can be formed, for example, in the following manner. The linear passages respectively extending from the wall of one of the front and rear ends of the coil case 20 which is elongated in the forward and rearward direction to the opposite end portion, are formed by using a drill or the like. Then, a turn-back passage is formed from laterally to be connected to the end portions of the drilled passages. Lastly, an unnecessary passage in the vicinity of the side surface is sealed by welding or the like.

In accordance with the above described configuration, the six coil cases 20 and the superconducting coil-conductor plate assemblies 30 stored therein can be cooled effectively, by using the cooling medium flowing through the cooling medium pipe 50 and the cooling medium passages 23. The above described specific configurations of the cooling medium pipe 50 and of the cooling medium passages 23 are merely exemplary, and may be suitably modified depending on the kind of the cooling medium, the materials, sizes, or the like of the rotary shaft 10 and of the coil cases 20, etc., of course.

As shown in FIG. 11, the gap 70 is formed between the recess 11 and the convex portion 24. More specifically, the gap 70 is formed between the bottom surface of the recess 11 and the upper surface of the convex portion 24. The gap 70 may be formed in such a manner that the bottom surface of the recess 11 and the upper surface of the convex portion 24 are formed as flat surfaces, respectively, and the depth (height of side surfaces 12) of the recess 11 is set larger than the height (height of side surfaces 26) of the convex portion 24. Preferably, the height (thickness) of the gap 70 is sufficient to store the pole protection circuit 37 therein and to suppress heat transfer from the rotary shaft 10 to the coil case 20. Specifically, for example, the height (thickness) of the gap 70 is preferably set to 3 mm or more and 10 mm or less. As defined herein, the height (thickness) refers to the height (thickness) in the radial direction of the rotary shaft 10.

The rotary shaft 10 is not easily cooled, because heat is transferred from an outside bearing or the like to the rotary shaft 10. The gap 70 allows for heat insulation between the rotary shaft 10 with a relatively high temperature and the coil case 20 with a relatively low temperature, which makes it possible to efficiently cool the superconducting coil-conductor plate assembly 30 stored in the coil case 20.

As shown in FIG. 10, the superconducting coil-conductor plate assembly 30 includes the superconducting coil of a race truck type shown in FIG. 2. In a linear portion of the coil of the race truck type, the hoop stress generated during the current supply increases especially, and there is a higher probability that the coil will be mechanically broken down. In the present example, the wall of the coil case 20 applies to the superconducting coil-conductor plate assembly 30 a normal force against the hoop stress. Therefore, such a probability of breakdown can be significantly reduced. The superconducting coil-conductor plate assembly 30 is formed of, for example, a bismuth based superconductive wire material, or a yttrium based superconductive wire material. The superconducting coil-conductor plate assembly 30 is cooled to, for example, about 30K by use of the cooling medium flowing through the cooling medium passage 23 and thereby is placed in a superconductive state.

Each of the superconducting coil-conductor plate assemblies 30 includes, for example, four superconducting coils. All of twenty four conducting coils of the six superconducting coil-conductor plate assemblies 30 constituting six field poles are connected in series via wires (not shown) extending into the holes (not shown) formed in the walls of the coil cases 20. The both ends of the current path constituted by the twenty four superconducting coils are guided to outside the rotary machine via the wires (not shown) inside the rotary shaft 10 and the power supply member 9 (FIG. 12) and are connected to the power supply 3 (see FIG. 12). When a current is supplied to the wires, the six superconducting coil-conductor plate assemblies 30 are excited to N-pole and S-pole alternately in the circumferential direction.

The wedge member 40 has a plurality of holes into which screws are inserted, respectively, to fasten the wedge member 40 to the rotary shaft 10. The coil case 20 and the wedge member 40 are fastened to the rotary shaft 10 by using screws such as bolts. In a state in which the coil case 20 and the wedge member 40 are fastened to the rotary shaft 10, the side surface of the coil case 20 is in surface contact with the side surface of the wedge member 40. The side surface of the coil case 20 and the side surface of the wedge member 40 may be entirely or partially in contact with other.

Figure 12:
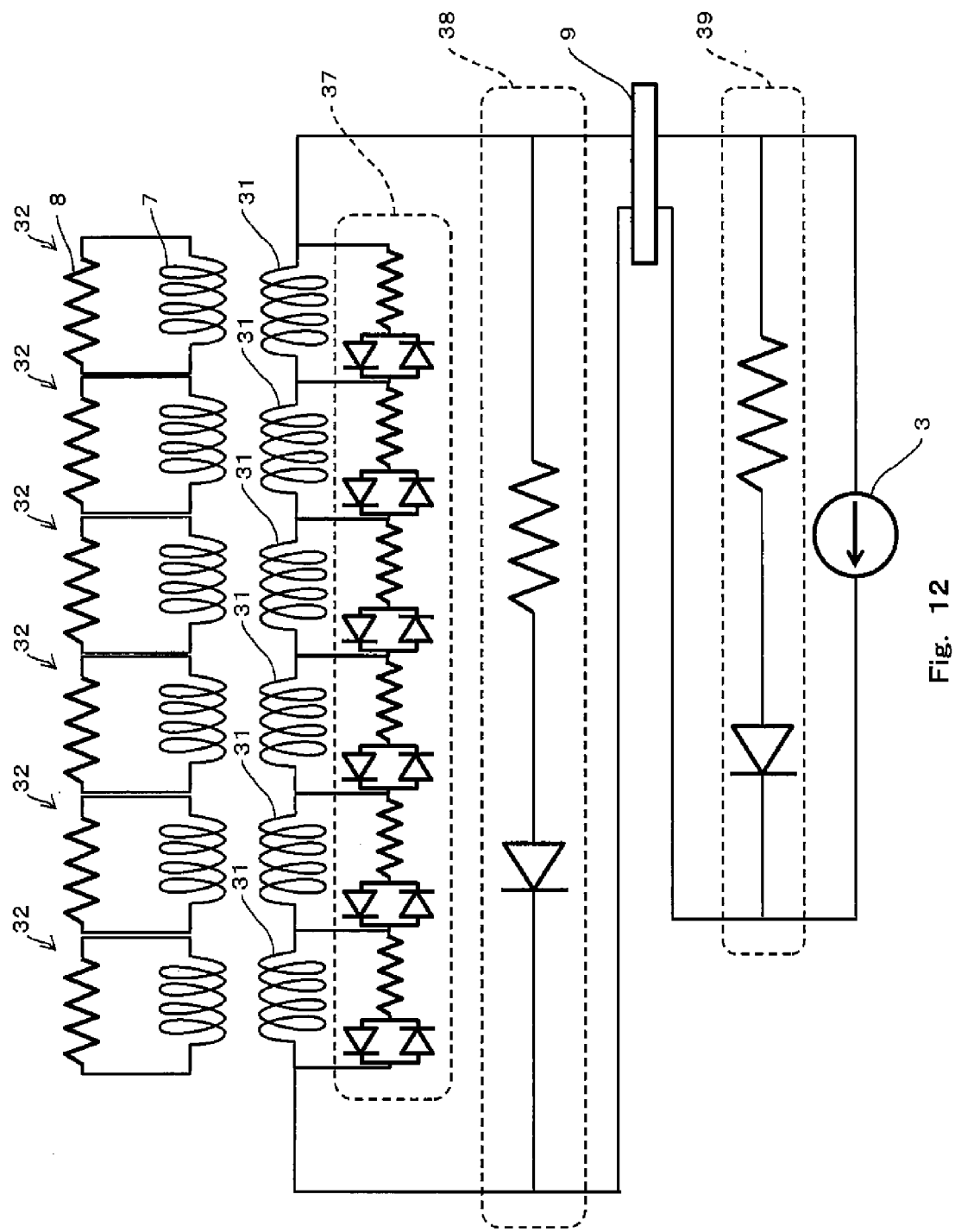
FIG. 12 is an example of an equivalent circuit diagram of the superconducting rotary machine according to Example 2 of Embodiment 2.

FIG. 12 is an example of an equivalent circuit diagram of the superconducting rotary machine according to Example 2 of Embodiment 2. In FIG. 12, four superconducting coils provided in each of the field poles are drawn as a single superconducting coil 31, for simplified illustration. Also, five conductor plates provided in each of the field poles are drawn as a single conductor plate 32, for simplified illustration. In FIG. 12, the same components as those in FIG. 3 are designated by the same reference symbols and will not be described in detail repeatedly.

As shown in FIG. 12, the superconducting rotary machine according to the present example includes the superconducting coils 31 provided in six field poles, respectively, the six pole protection circuits, the internal protection circuit 38, and the external protection circuit 39 (second protection circuit).

In the example of FIG. 12, the pole protection circuits 37 and the internal protection circuit 38 constitute the first protection circuit. One of the pole protection circuits 37 and the internal protection circuit 38 may be omitted. The power supply 3 may be a constant current power supply.

The pole protection circuits 37 are provided in the rotary shaft 10 (inside the field rotor 100), and connected in parallel with the superconducting coils 31 of the plurality of field poles of the superconducting rotary machine, respectively, to protect the superconducting coils 31, respectively.

The internal protection circuit 38 is provided in the rotary shaft 10 (inside the field rotor 100), and connected in parallel with the both ends of the series path in which all of the superconducting coils 31 of the field poles are connected in series, to protect the superconducting coils 31. The internal protection circuit 38 is connected in parallel with the series path between the series path and the power supply member 9. The series path connects all of the superconducting coils 31 in series in a case where all of the superconducting coils 31 of the field poles are connected in series. Specifically, for example, the internal protection circuit 38 may be provided in a cylindrical inner space extending through the rotary shaft 10 in the center axis direction.

The external protection circuit 39 is provided in the stationary section (section which is not rotated along with the field rotor 100 and is fixed) and connected in parallel with the superconducting coils 31 with respect to the power supply 3, to protect the superconducting coils 31.

In the example of FIG. 12, the first protection circuit includes the pole protection circuits 37 and the internal protection circuit 38. The first protection circuit is provided in the rotary shaft 10 and connected in parallel with the superconducting coils 31 with respect to the power supply 3, to protect the superconducting coils 31.

In this configuration, the conductor plates 32, the pole protection circuits 37, the internal protection circuit 38, and the external protection circuit 39 serve as the mechanism for protecting the superconducting coils 31. Since the coil protection mechanism includes the conductor plates 32, a load placed on the pole protection circuits 37, the internal protection circuit 38, and the external protection circuit 39 can be lessened, and as a result, the superconducting rotary machine can be designed easily.

The first protection circuit provided in the rotary section and the second protection circuit provided in the stationary section allow the superconducting coils to be protected, even when a problem occurs in the power supply member as well as when the quench occurs.

The configuration including the pole protection circuits 37 allows the superconducting coils to be protected even when a disconnection occurs in the vicinity of the superconducting field poles.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A magnetic field generating device and a superconducting rotary machine including the magnetic field generating device, of the present invention are effectively used as a magnetic field generating device and a superconducting rotary machine including the magnetic field generating device, respectively, which can more quickly release the energy owned by the superconducting coils to outside the superconducting coils, when quench occurs.

REFERENCE SIGNS LIST 1 magnetic field generating device
2 constant current power supply
3 power supply
4 protection circuit
5 diode
6 resistor
7 induction coil
8 resistor
9 power supply member
10 rotary shaft
11 recess
12 side surface
14 room temperature damper
15 vacuum heat insulating layer
16 rotary shaft structural member
17 conduction cooling member
18 cooling mechanism
20 coil case
21 box member
22 lid member
23 cooling medium passage
24 convex portion
26 side surface
30 superconducting coil-conductor plate assembly
31 superconducting coil
32 conductor plate
33 resistor
34 diode
35 low-heat contraction member
37 pole protection circuit
38 internal protection circuit
39 external protection circuit
40 wedge member
50 cooling medium pipe
70 gap
100 field rotor

The invention claimed is:

1. A magnetic field generating device comprising:
a single superconducting coil or a plurality of superconducting coils formed by winding a superconductive wire material;
unseparated conductor plates, each unseparated conductor plate comprising an electric conductor and being placed such that the conductor plate is insulated from the single superconducting coil or the plurality of superconducting coils and is adjacent to the single superconducting coil or the plurality of superconducting coils in a winding axis direction of the single superconducting coil or the plurality of superconducting coils, and a main surface of the unseparated conductor plate faces the single superconducting coil or the plurality of superconducting coils; and
a protection circuit which is connected in parallel with the single superconducting coil or the plurality of superconducting coils and attenuates a current flowing through the single superconducting coil or the plurality of superconducting coils,
wherein the plurality of superconducting coils are stacked together such that their winding axis directions conform to each other,
wherein when the winding axis direction of the superconducting coil is a vertical direction, the unseparated conductor plates are placed such that one unseparated conductor plate is located on each of upper and lower sides of the single superconducting coil or an entire of the plurality of superconducting coils stacked together, and
wherein the one unseparated conductor plate located on each of upper and lower sides of the single superconducting coil or an entire of the plurality of superconducting coils stacked together covers an entire surface of the superconductive wire material wound to form the single superconducting coil or the plurality of superconducting coils, and an entire upper side or lower side of a space surrounded by the wound superconductive wire material, in the winding axis direction of the superconducting coil.

2. The magnetic field generating device according to claim 1,
wherein a conductor plate is placed such that the conductor plate is located between adjacent superconducting coils of the plurality of superconducting coils stacked together,
wherein the conductor plate comprises an electric conductor, is unseparated, and is placed such that the conductor plate is insulated from the adjacent superconducting coils and one of main surfaces of the conductor plate faces the adjacent superconducting coils.

3. The magnetic field generating device according to claim 1,
wherein the single superconducting coil or the plurality of superconducting coils has a race track shape.

4. The magnetic field generating device according to claim 1,
wherein each unseparated conductor plate has a flat plate shape which does not have a groove over an entire surface.

5. The magnetic field generating device according to claim 1,
wherein each unseparated conductor plate has a thickness which is as large as or larger than $3/10$ of a thickness of the single superconducting coil or the plurality of superconducting coils in the winding axis direction.

6. The magnetic field generating device according to claim 1,
wherein each unseparated conductor plate has a thickness of 3 mm or larger.

7. The magnetic field generating device according to claim 1,
wherein each unseparated conductor plate is formed of a material with a resistivity of $1.0 \times 10^{-9}$ $\Omega$m or less under an operating temperature of the single superconducting coil or the plurality of superconducting coils.

8. The magnetic field generating device according to claim 1,
wherein each unseparated conductor plate is formed of at least one material which is selected from the group consisting of copper with a purity degree of 99.95% or more, aluminum with a purity degree of 99.95% or more, pure gold, and pure silver and has a residual resistance ratio of 100 or more.

9. A superconducting rotary machine including the magnetic field generating device according to claim 1, comprising:
a rotary shaft; and
a superconducting coil-conductor plate assembly which is fastened to the rotary shaft, and includes (1) the single superconducting coil or the plurality of superconducting coils and (2) the unseparated conductor plates,
wherein the single superconducting coil or the plurality of superconducting coils constitutes a field winding of the superconducting rotary machine, the superconducting rotary machine further comprising:
a power supply for supplying a current to the single superconducting coil or the plurality of superconducting coils.

10. The superconducting rotary machine according to claim 9,
wherein the protection circuit is provided in a stationary section and connected in parallel with the single superconducting coil or the plurality of superconducting coils with respect to the power supply, to protect the single superconducting coil or the plurality of superconducting coils.

11. The superconducting rotary machine according to claim 9,
wherein the protection circuit is provided in the rotary shaft and connected in parallel with the single superconducting coil or the plurality of superconducting coils with respect to the power supply, to protect the single superconducting coil or the plurality of superconducting coils.

12. The superconducting rotary machine according to claim 11,
wherein the protection circuit includes a plurality of pole protection circuits connected in parallel with the single superconducting coil or the plurality of superconducting coils of each of a plurality of field poles of the superconducting rotary machine, to protect the single superconducting coil or to protect the superconducting coils, respectively; and
an internal protection circuit connected in parallel with both ends of a series path in which all of the superconducting coils of the field poles are connected in series, to protect the superconducting coils.

13. The superconducting rotary machine according to claim 9,
wherein the protection circuit includes a first protection circuit which is provided in the rotary shaft and connected in parallel with the single superconducting coil or the plurality of superconducting coils with respect to the power supply, to protect the single superconducting coil or the plurality of superconducting coils; and
a second protection circuit which is provided in the stationary section and connected in parallel with the single superconducting coil or the plurality of superconducting coils with respect to the power supply, to protect the single superconducting coil or the plurality of superconducting coils.

14. The superconducting rotary machine according to claim 13,
wherein the first protection circuit includes a plurality of pole protection circuits connected in parallel with
the single superconducting coil or the plurality of superconducting coils of each of a plurality of field poles of the superconducting rotary machine, to protect the single superconducting coil or to protect the plurality of superconducting coils, respectively; and
an internal protection circuit connected in parallel with both ends of a series path in which all of the superconducting coils of the field poles are connected in series, to protect the superconducting coils.

15. A superconducting rotary machine including the magnetic field generating device according to claim 1, comprising:
a rotary shaft; and
a superconducting coil-conductor plate assembly which is fastened to the rotary shaft, and includes (1) the single superconducting coil or the plurality of superconducting coils and (2) the unseparated conductor plates;
wherein the single superconducting coil or the plurality of superconducting coils constitutes a field winding of the superconducting rotary machine; the superconducting rotary machine further comprising:
a power supply member; and
a power supply provided in the stationary section and configured to supply a current to the single superconducting coil or the plurality of superconducting coils via the power supply member;
wherein the protection circuit includes a first protection circuit which is provided in the rotary shaft and connected in parallel with the single superconducting coil or the plurality of superconducting coils with respect to the power supply, to protect the single superconducting coil or the plurality of superconducting coils; and
a second protection circuit which is provided in the stationary section and connected in parallel with the single superconducting coil or the plurality of superconducting coils with respect to the power supply, to protect the single superconducting coil or the plurality of superconducting coils.

16. The superconducting rotary machine according to claim 15,
wherein the first protection circuit includes:
a plurality of pole protection circuits connected in parallel with
the single superconducting coil or the plurality of superconducting coils of each of a plurality of field poles of the superconducting rotary machine, to protect the single superconducting coil or to protect the plurality of superconducting coils, respectively; and
an internal protection circuit connected in parallel with both ends of a series path in which all of the superconducting coils of the field poles are connected in series, to protect the superconducting coils.

17. The magnetic field generating device according to claim 1,
wherein each unseparated conductor plate has the same shape as that of a contour of the single superconducting coil or the plurality of superconducting coils, when viewed from the winding axis direction of the single superconducting coil or the plurality of superconducting coils.

\* \* \* \* \*